United States Patent [19]
Getty, Jr.

[11] 3,790,130
[45] Feb. 5, 1974

[54] SEAT FOR BUTTERFLY VALVES

[75] Inventor: John A. Getty, Jr., Tulsa, Okla.

[73] Assignee: Dover Corporation, Tulsa, Okla.

[22] Filed: May 30, 1972

[21] Appl. No.: 257,950

[52] U.S. Cl. ............................................. 251/306
[51] Int. Cl. ........................................... F16k 1/226
[58] Field of Search ........................... 251/306, 305

[56] References Cited
UNITED STATES PATENTS
3,329,398   7/1967   Goldsmith ......................... 251/306
3,473,784  10/1969   Radford ............................ 251/306
3,338,551   8/1967   Black ................................ 251/306

Primary Examiner—Henry T. Klinksiek
Attorney, Agent, or Firm—James R. Head et al.

[57] ABSTRACT

An improved seat for a valve having an outer tubular liner of relatively hard, inflexible material, an inner tubular member of resilient material bonded to the outer liner internal circumferential surface and thermal communication means between the outer circumferential surface of the liner and the inner member whereby in securing the inner member to the outer liner improved bonding is obtained.

6 Claims, 4 Drawing Figures

PATENTED FEB 5 1974 3,790,130

3,790,130

SEAT FOR BUTTERFLY VALVES

BACKGROUND, SUMMARY AND OBJECTS OF THE INVENTION

This invention will be described as it specifically relates to butterfly valves as an illustration of one embodiment of the invention, it being understood that such illustration is by way of example only and that the invention is no way limited to application in butterfly valves.

Butterfly valves have become a highly popular device for controlling the flow of fluid and gases. A typical type of butterfly valve includes a disc having a circumferential sealing surface, the disc being rotatably supported in the flow passageway of a valve body. When the disc is rotated such that the plane thereof is perpendicular to the fluid passageway the peripheral edges of the disc seal against the body sealing surface to close the valve. When the disc is rotated 90° from the closed position to the position wherein the plane of the disc is parallel to the axis of the flow passageway fluid can flow freely to either side of the disc and the valve is in the fully open position.

In recent years the use of the combination of a metal disc having a circumferential seating surface with a resilient liner positioned within the valve body fluid passageway has become a common arrangement in butterfly valves. In order to effectively seal against the periphery of the valve disc the valve seat must have resilience so as to deform slightly as the disc moves into closed position. A resilient seat by itself, however, will not retain its position within the valve body, as an expedient has been developed including the use of a seat formed of two portions, the first being the inner resilient portion, and the second being an outer rigid liner portion. The outer rigid portion or liner may typically be made of hard plastic material, metal or the like. To reinforce the resilient portion it must be bonded to the liner. A typical arrangement for manufacturing the seat is to place the preformed liner in a mold and inserting material into the mold to form the resilient member. The mold is brought up to a bonding temperature and maintained at such temperature, according to the size of the seat and characteristics of the materials, to achieve bonding of the resilient member to the liner. In small size valves, that is, up to four to six inches, the molds are relatively small and the quantity of the material is such that the contact area between the liner and the resilient material can be brought to the temperature necessary to achieve bonding without undue problems. A difficulty exists, however, in liners for large size valves in which the quantity of resilient material is substantailly greater, in which the contact area between the insert and the resilient material is substantially greater, and in which the mold volume to be heated is substantially greater. The problem of achieving effective bonding is made even more difficult when the configuration of the resilient member is such that the seating contact area is defined by an integral reduced internal diameter portion, that is, a thicker portion. Heating this thicker portion to bonding temperature in manufacturing seat inserts for larger size valves is difficult.

The present invention is concerned with means for improving the bonding of the resilient inner member to the outer tubular liner of a valve seat.

More particularly, an object of this invention is to provide an improved seat for valves including improved configuration of components so as to achieve improved bonding of the outer tubular liner with the inner tubular resilient member.

These general objects as well as more specific objects will be fulfilled in the following specification and claims, taken in conjunction with the attached drawing.

As an example of an insert seat having an outer tubular liner of relatively hard and flexible material and an inner tubular member of resilient material, reference may be made to copending application No. 47,752, filed June 1970, entitled: "Butterfly Valve."

DESCRIPTION OF VIEWS

DETAILED DESCRIPTION

Figure 1:
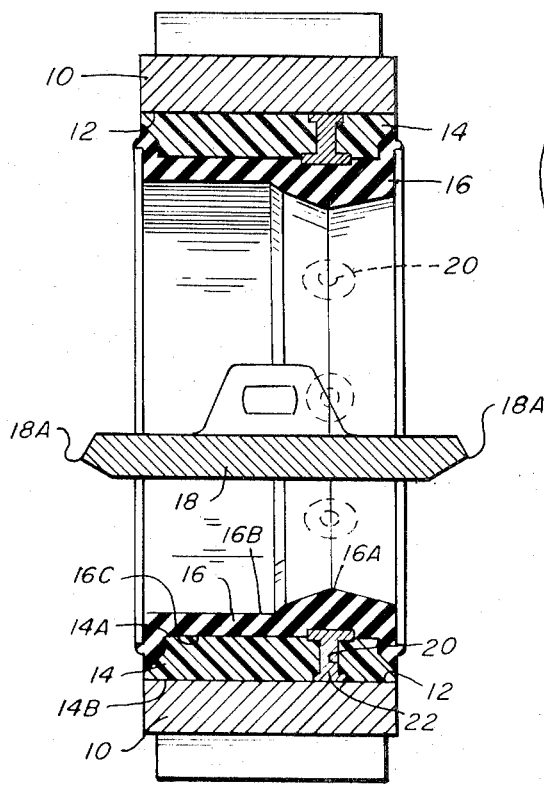
FIG. 1 is a cross-sectional view of a valve showing a valve body having a seat member removably positioned within the valve body and showing the means of improving the bonding of the seat portions to each other.

Referring to FIG. 1 a cross-sectional view of a valve, in this case a typical butterfly valve, is shown. For more detailed information as to the construction of the butterfly valve of the type to which this invention may by way of example be applied, reference may be had to copending application Ser. No. 47,752, mentioned above. The valve includes a body 10 having a fluid passageway opening 12 therethrough. Positioned internally of the fluid passageway 12 is the valve seat composed on two portions, that is, an outer tubular liner 14 of relatively hard inflexible material, and an inner tubular member 16 of resilient material. The inner member 16 is bonded to the outer member 14.

Rotatably supported within the valve body flow passageway 12 is a disc 18. The disc in FIG. 1 is shown in the open position wherein fluid can flow to either side, when rotated 90° the peripheral surfaces 18A of the disc engage the resilient member 16 to close the valve.

The valve seat is slidably positioned within the fluid passageway 12 and is held in position by flanges applied at each end of the valve body when the valve is assembled in working condition. The valve stems (not shown) extend through the valve seat to pivotally support the disc. One of the valve stems extends externally of the valve body 10 to provide means for rotation of the disc.

The valve described to this point is typical of butterfly valves having removable seats. In order to provide improved closing contact with the disc of periphery 18A the inner member 16 is preferably provided with an integral reduced internal diameter seating portion 16A, that is, a portion having greater thickness.

As previously indicated the resilient portion 16 must be thoroughly bonded to the liner 14 to rigidly support the resilient portion within the valve, otherwise, it can be displaced by fluid flow through the valve and thereby result in valve failure. The typical means of bonding the inner member 16 to liner 14 is to place the liner 14 in a mold. The resilient material 16 is inserted into the mold and heat is applied to the mold to bring the components 14 and 16 up to the curing and bonding temperature. Since heat is applied essentially to the exterior of the mold, heat must flow through the liner 14 to the inner member 16 and bring the temperature of the inner member to bonding level. Liner 14 is usually made of a material such as phenolic, plastic, hard rubber, fiber reinforced material, such as fiberglass or the like. Such materials are all relatively low heat conductors. This means that getting heat to flow through the liner 14 to bring the temperature of the inner member 16 to curing and bonding temperature is sometimes difficult. When the liner 14 is of a relatively small size, as occurs in valves up to 6 inches in diameter, little difficulty is experienced in obtaining sufficient heat transfer to achieve complete bonding of the resilient inner member 16 to the liner. However, in larger size valves, of 8 inch sizes and up, the volume of the material in the area of the surfaces which must be heated to curing and bonding temperature are such that it is sometimes difficult to achieve completely effective bonding. This is particularly true in the area opposite the thicker seating portion 16A. This invention provides a means of improving the heat flow from the exterior of the liner 12 to the area of greatest thickness of inner member 16.

Figure 2:
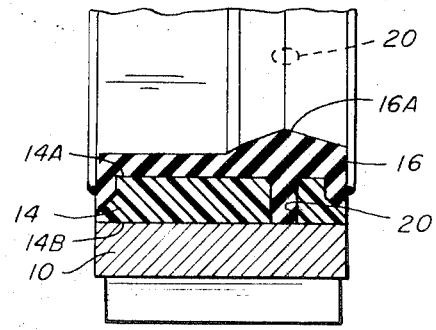
FIG. 2 is a partial cross-sectional view of the valve body as shown in FIG. 1 showing an alternate arrangement of the invention.

This improved heat flow is obtained by providing thermal communication between the outer circumferential surface 14B of the liner 14 and the reduced internal diameter seating portion 16A of the innner member. This thermal communication means may be provided in a variety of ways. Illustrated in the drawings are three different means for providing thermal communication. In FIG. 2 thermal communication is provided by spaced apart apertures 20 between the inner circumferenential surface 14A and the outer circumferential surface 14B of liner 14. This permits the material of resilient inner portion 16 to flow through apertures 20 to the exterior circumferential surface 14B of liner 14. Thus as heat is applied to the exterior circumferential surface of liner 14 heat flows by way of the aperture 12 to bring the temperature of the resilient inner portion 16, and particularly the thicker portion 16A, to bonding temperature. In addition, the portion of the inner member extending within aperture 20 is thoroughly bonded to the liner 14.

FIG. 1 shows an alternate arrangement. In this arrangement each aperture 20 is filled with a heat conducting insert 22. The insert 22 may have an enlarged portion at each end (as shown in FIG. 1) or may be cylindrical or of any other practical shape. Insert 22 is preferably of some good heat conducting material, such as metal.

Figure 3:
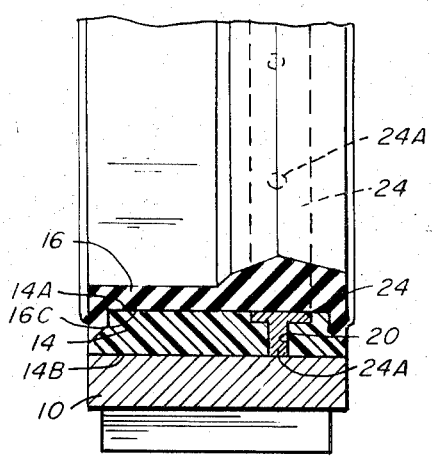
FIG. 3 is a partial cross-sectional view of a valve body as shown in FIG. 1 showing an additional alternate arrangement of the invention.

FIG. 3 shows an additional alternate arrangement in which a heat conducting ring 24 is formed to extend around the complete outer periphery 16C of the inner member 16. Integrally extending from the ring are radial heat conducting portions 24A received in each of the apertures 20. While in FIG. 3 the ring 24 is shown recessed within the inner circumferential surface 14 of the liner, it can be seen that the ring may be positioned interiorly of the inner circumferential surface 14A, to be surrounded on three sides by inner member 16.

Figure 4:
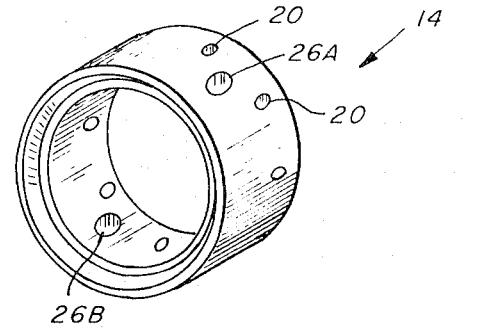
FIG. 4 is an isometric view of a valve seat liner portion as it would typically be formed prior to having the resilient inner portion molded to it.

FIG. 4 shows a liner 14 having spaced apertures 20 therein. In addition liner 14 typically includes diametrical openings 26A and 26B, which receive the stems (not shown) supporting the disc within the valve.

The specific configuration of liner 14 and inner member 16 are not a part of this invention, as such configuration may vary considerably. In addition, while the drawings show the valve in the arrangement wherein the disc 16 and therefore the body seating surface 16A, is perpendicular to the axis of fluid passageway 12, such arrangement may vary. In some valve designs the plane of the disc is at an angle relative to the axis of the fluid passageway 12 when the disc is in closed position and the inner member seating portion 16A is likewise molded in a path to coincide with the periphery of the disc in closed position. In valve designs of this type the apertures 20 in liner 14 will follow the configuration of the inner member 16 so as to lie beneath the inner member seating portion 16A.

The heat conducting inserts 22 or 24 with the integral portion 24A extending therefrom, or other similar heat conducting elements may be molded in place as the liner 14 is molded or they may be inserted in apertures 20 in the liner.

While the invention has been described with a certain degree of particularity it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element or step thereof is entitled.

What is claimed:

1. An improved seat for a valve comprising:
    an outer tubular line of relatively hard inflexibe material having an outer circumference configured to be slidably received in a valve body;
    an inner tubular member of resilient material bonded to said outer liner internal circumferential surface, the inner resilient member having an integral reduced internal diameter seating portion providing a reduced diameter seating surface; and
    means extending between the outer circumferential surface of said liner and the outer circumference of said inner member in the proximity of said reduced internal diameter seating portion of said inner member for transmitting head to said inner member during bonding thereof to the liner.

2. An improved seat for valves according to claim 1 wherein said heat transmitting means includes spaced apart apertures in said liner positioned between the inner and outer circumferential surfaces thereof and opposite said resilient tubular member reduced internal diameter seating portion, whereby portions of said inner resilient member fills said apertures for transmitting heat to said inner member during said bonding operation.

3. An improved seat for valves according to claim 1 wherein said heat conducting means includes spaced apart apertures in said liner communication the outer with the inner circumferential surface thereof, and including:
    an insert of heat conducting material positioned in each of said apertures for transmitting heat to said inner member during said bonding operation.

4. An improved seat for valves according to claim 3 wherein each said insert has an integral enlarged diameter portion of said heat conducting material on the end thereof contacting said resilient inner member.

5. An improved seat for valves according to claim 3 wherein each insert is carried by a common ring of heat conducting material and extending radially outwardly therefrom, said ring being disposed adjacent the resilient inner member opposite said reduced internal diameter seating position.

6. An improved seat for a valve comprising:
an outer tubular liner of relatively hard inflexible material having an outer circumference configured to be slidably received in a valve body;
an inner tubular member of resilient material bonded to said outer liner internal circumferential surface, the inner resilient member having an integral reduced internal diameter seating portion providing a reduced diameter seating surface; and
thermal communication means between the outer circumferential surface of said inner and said reduced internal diameter seating portion of said inner member, said thermal communication means including spaced apart apertures in said liner communicating the outer with the inner circumferential surface thereof, and including:
a thermal transmitting insert positioned in each of said apertures, each of said thermal transmitting inserts being of metal.

* * * * *